US008413899B2

(12) United States Patent
Iida

(10) Patent No.: US 8,413,899 B2
(45) Date of Patent: Apr. 9, 2013

(54) PURCHASED ARTICLE REGISTRATION APPARATUS AND METHOD

(75) Inventor: Shuuichi Iida, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 207 days.

(21) Appl. No.: 12/906,284

(22) Filed: Oct. 18, 2010

(65) Prior Publication Data

US 2011/0089234 A1    Apr. 21, 2011

(30) Foreign Application Priority Data

Oct. 20, 2009 (JP) ................................ 2009-241516

(51) Int. Cl.
*G06K 15/00* (2006.01)
*G06K 5/00* (2006.01)
*G06F 7/08* (2006.01)
*G07G 1/12* (2006.01)
*G07G 5/00* (2006.01)

(52) U.S. Cl.
USPC ........... 235/383; 235/378; 235/380; 235/381; 705/24; 705/14.31

(58) Field of Classification Search .................. 235/378, 235/380, 381, 383; 705/24, 14.31
See application file for complete search history.

(56) References Cited

U.S. PATENT DOCUMENTS

| | | | | |
|---|---|---|---|---|
| 5,154,260 | A * | 10/1992 | Patel | 186/55 |
| 5,167,301 | A * | 12/1992 | Cappi et al. | 186/66 |
| 5,313,766 | A * | 5/1994 | Rimondi et al. | 53/451 |
| 6,213,395 | B1 * | 4/2001 | Dejaeger et al. | 235/383 |
| 6,296,184 | B1 * | 10/2001 | Dejaeger | 235/383 |
| 6,296,185 | B1 * | 10/2001 | Dejaeger | 235/383 |
| 2001/0018669 | A1 * | 8/2001 | Fujiwara | 705/26 |
| 2003/0230052 | A1 * | 12/2003 | Rabiea | 53/459 |
| 2003/0232708 | A1 * | 12/2003 | Rabiea | 493/180 |
| 2004/0041021 | A1 * | 3/2004 | Nugent, Jr. | 235/383 |
| 2004/0251371 | A1 * | 12/2004 | Rabiea | 242/422.4 |
| 2005/0183402 | A1 * | 8/2005 | Ball | 53/571 |
| 2007/0100694 | A1 * | 5/2007 | Kopps | 705/14 |
| 2008/0199107 | A1 * | 8/2008 | Nicholson | 383/7 |
| 2010/0108943 | A1 * | 5/2010 | Halper et al. | 252/194 |
| 2010/0226596 | A1 * | 9/2010 | Lee | 383/8 |

(Continued)

FOREIGN PATENT DOCUMENTS

| | | |
|---|---|---|
| JP | 2005267346 | 9/2005 |
| JP | 2009-187137 | 8/2009 |

OTHER PUBLICATIONS

Japanese Office Action for Japanese Application No. 2009-241516 mailed on Oct. 25, 2011.

*Primary Examiner* — Daniel Walsh
(74) *Attorney, Agent, or Firm* — Turocy & Watson, LLP

(57) ABSTRACT

According to one embodiment, a purchased article registration apparatus includes a declaration unit, an input unit, a determination unit, and a notification unit. The declaration unit accepts a declaration input indicating that a customer carries a reusable shopping bag with which the customer takes a purchased article home. The input unit accepts input of article identification data that can identify the article purchased by the customer. The determination unit determines whether the article specified by the article identification data having its input accepted by the input unit is an article to be separately packaged or not. The notification unit notifies that separate packaging should be provided, when the declaration that the customer carries the reusable shopping bag is accepted and it is determined that the article is an article to be separately packaged.

10 Claims, 7 Drawing Sheets

U.S. PATENT DOCUMENTS

| | | | | |
|---|---|---|---|---|
| 2011/0022487 | A1* | 1/2011 | Cook et al. | 705/23 |
| 2011/0133947 | A1* | 6/2011 | Kraguljac | 340/686.6 |
| 2011/0264607 | A1* | 10/2011 | Bell et al. | 705/500 |
| 2011/0270696 | A1* | 11/2011 | Vincent et al. | 705/23 |
| 2011/0320296 | A1* | 12/2011 | Edwards | 705/23 |
| 2012/0066156 | A1* | 3/2012 | Pryor et al. | 705/500 |

* cited by examiner

281

| Article code | Attribute code | Article name | Unit price | … | Separate packaging F | Message No |
|---|---|---|---|---|---|---|
| xxxxxxxx1 | 001 | Lettuce | 158 | … | 1 | 10 |
| xxxxxxxx2 | 002 | Minced pork | 357 | … | 1 | 20 |
| xxxxxxxx3 | 003 | Bleach | 500 | … | 0 | 0 |
| xxxxxxxx4 | 001 | Tomato | 200 | … | 0 | 0 |
| xxxxxxxx5 | 002 | Sausage | 850 | … | 0 | 0 |
| xxxxxxxx6 | 004 | Detergent | 600 | … | 1 | 30 |
| ⋮ | ⋮ | ⋮ | ⋮ | … | ⋮ | ⋮ |

FIG. 3

282

| Message No | Message data |
|---|---|
| 10 | This article tends to become moist.<br>Check whether separate packaging is needed ! |
| 20 | Liquid or the like tends to spill from this article.<br>Check whether separate packaging is needed ! |
| 30 | This article is strong-scented.<br>Check whether separate packaging is needed ! |

FIG. 4

PURCHASED ARTICLE REGISTRATION APPARATUS AND METHOD

CROSS-REFERENCE TO RELATED APPLICATIONS

This application is based upon and claims the benefit of priority from Japanese Patent Application No. 2009-241516, filed on Oct. 20, 2009, the entire contents of which are incorporated herein by reference.

FIELD

Embodiments described herein relate generally to a purchased article registration apparatus and method used in a retail store handling articles that need separate packaging.

BACKGROUND

In Japan, many retail stores such as supermarkets give plastic shopping bags for free to customers who do not bring shopping bags. Many of these plastic shopping bags are disposed of as plastic household wastes. Thus, recently, as a part of the environmental protection movement, some local governing bodies prohibit the free provision of plastic shopping bags, aiming to increase customers who bring their own shopping bags. Moreover, stores give privileges such as extra points or discounts to customers who decline to receive plastic shopping bags, trying to reduce the provision of plastic shopping bags.

Despite these efforts, the provision and use of plastic shopping bags is not decreased. One of the reasons is the handling of articles purchased at supermarkets. Supermarkets sell foodstuffs from which liquid or the like tends to spill such as meat and fish, foods which tend to become frosted such as beverages and frozen food, strong-scented miscellaneous goods such as detergents, and so on. It is better to separately package these articles when putting these articles into shopping bags. Therefore, plastic grocery bags for separate packaging are prepared in the stores.

There is a movement among computer vendors to develop a system that notifies a salesclerk of whether the salesclerk should separately pack individual articles or not. This system utilizes a point of sales terminal and has a data table in which necessary information to assist the packing of each article is set in association with an article identification code to identify the article. Every time an article identification code is inputted, the point of sales terminal refers to the data table and shows, on a display, necessary information for the article, for example, "Put the article in a plastic grocery bag since the sauce tends to leak".

In the conventional system, necessary information is displayed every time the identification code of an article is read into the point of sales terminal in the commercial transaction with each customer. Therefore, each time necessary information is displayed, the salesclerk must confirm the information and act accordingly. Thus, in a store where a customer purchases various kinds of articles all together in one transaction, for example, in a supermarket, the burden on the salesclerk increases and the process is still not practical.

Meanwhile, a shopping bag brought by a customer is reusable and is therefore called an eco-friendly bag or reusable shopping bag. Although a plastic shopping bag is usually not used repeatedly, an eco-friendly bag is used repeatedly. Therefore, the salesclerk must pay attention not to stain a reusable shopping bag such as an eco-friendly bag with articles or to prevent any smell from permeating into the reusable shopping bag. Thus, in the case of housing an article that might stain the reusable shopping bag or leave its smell in the reusable shopping bag, the article should be packaged separately.

However, in some cases, when housing articles directly in a customer's reusable shopping bag, the cashier may house an article from which liquid tends to leak without separately packaging this article, as in the case of a plastic shopping bag. Then, if the reusable shopping bag becomes stained, the degree of customer's satisfaction is significantly lowered.

BRIEF DESCRIPTION OF THE DRAWINGS

FIG. 3 shows the data structure of an article file saved in a hard disk drive of the settlement apparatus.

FIG. 4 shows the data structure of a message file saved in the hard disk drive of the settlement apparatus.

DETAILED DESCRIPTION

In general, according to one embodiment, a purchased article registration apparatus includes a declaration unit, an input unit, a determination unit, and a notification unit. The declaration unit accepts a declaration input indicating that a customer carries a reusable shopping bag with which the customer takes a purchased article home. The input unit accepts input of article identification data that can identify the article purchased by the customer. The determination unit determines whether the article specified by the article identification data having its input accepted by the input unit is an article to be separately packaged or not. The notification unit notifies that separate packaging should be provided, when the declaration that the customer carries a reusable shopping bag is accepted and it is determined that the article is an article to be separately packaged.

First Embodiment

Figure 1:
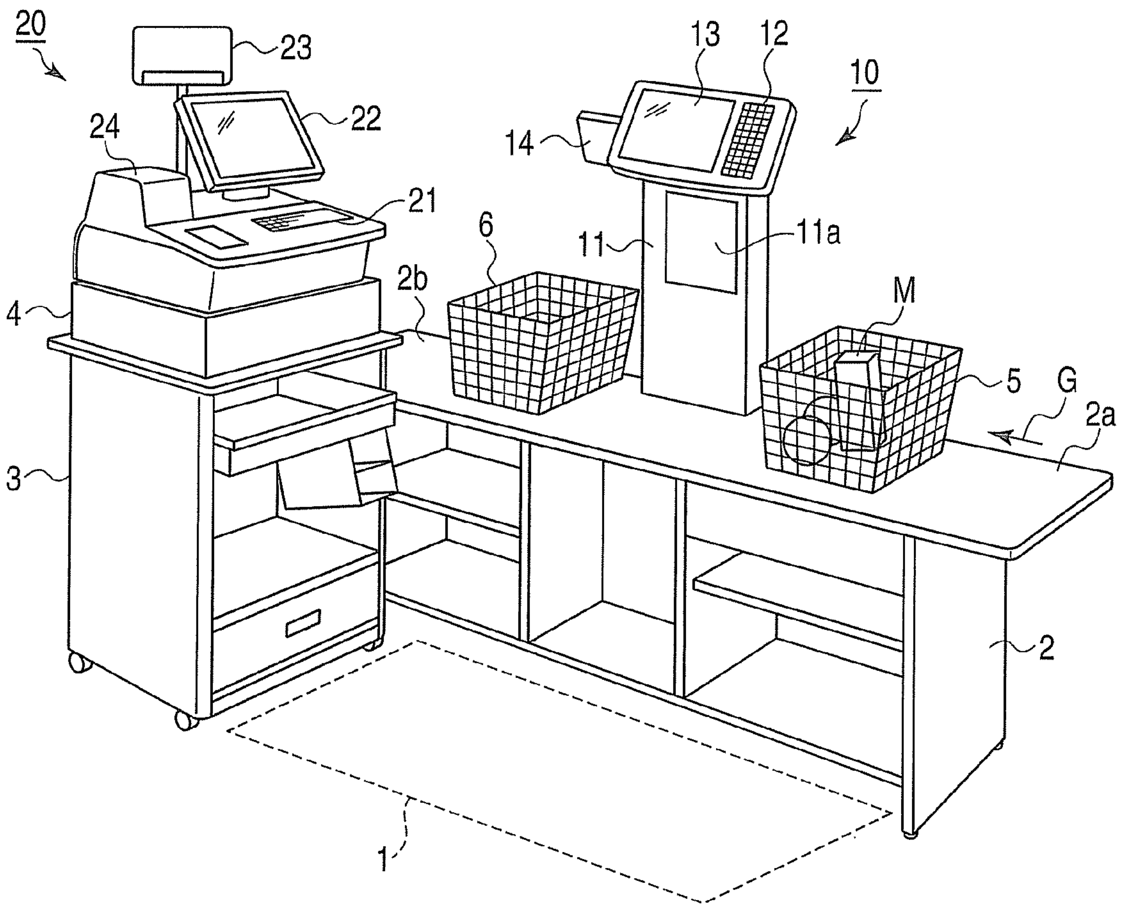
FIG. 1 is an appearance view showing the outline of an accounting system according to first and second embodiments.

FIG. 1 is an appearance view showing the outline of an accounting system according to this embodiment. The system includes a registration apparatus 10, a settlement apparatus 20, a checkout counter 2, and a stand 3 for the settlement apparatus 20.

The checkout counter 2 has an elongate rectangular shape along a customer pathway behind the checkout counter. The stand 3 is situated in front of an end of the checkout counter 2 on the downstream side in a direction of movement G of a customer moving along the checkout counter 2. A work area 1 for a cashier as a salesclerk in charge of accounting operation is the area to the front of the checkout counter 2 and to the front of the stand 3.

The registration apparatus 10 is situated substantially at the center of the checkout counter 2 and fixed on the top side of the counter 2. The settlement apparatus 20 is placed on a drawer 4 put on the top side of the stand 3. The registration apparatus 10 and the settlement apparatus 20 are installed with their respective front sides facing the work area 1 for the cashier. The settlement apparatus 20 is connected with the registration apparatus 10 by a communication cable, not shown.

The registration apparatus 10, used to register purchased articles, has a scanner 11, a keyboard 12, a touch panel 13, and a customer-side display 14, as necessary devices for the registration of articles. The scanner 11 is provided upright substantially at the center of the checkout counter 2, with a scanning window 11*a* facing the work area 1. The keyboard 12 and the touch panel 13 are attached on the top of the scanner 11 with their front sides facing the work area 1. The customer-side display 14 is attached on the top of the scanner 11 with its front side facing the side opposite to the work area 1.

A receiving surface 2*a* of the checkout counter 2 upstream from the registration apparatus 10 in the direction of movement G of the customer forms a space where a shopping container 5 housing an article M to be purchased by the customer is placed. A receiving surface 2*b* downstream in the direction of movement G of the customer forms a space where a shopping container 6 for putting therein the article M registered by the scanner 11 is placed.

The cashier in the work area 1 registers the article M housed in the shopping container 5, in the registration apparatus 10. That is, the cashier takes out the articles M one by one from the shopping container 5 and holds a surface of the article M to which a barcode is attached, over the scanning window 11*a* of the scanner 11. When the barcode is scanned by the scanner 11, the cashier puts the article M in the shopping container 6. At this point, when the customer carries a reusable shopping bag, the cashier puts the article M in the reusable shopping bag instead of the shopping container 6.

The cashier repeats the above article registration for each item of the articles M housed in the shopping container 5. When the registration of all the articles housed in the shopping container 5 is completed, the cashier operates the settlement apparatus 20 to carry out settlement.

The settlement apparatus 20, used for the settlement of registered articles, has a keyboard 21, an operator-side display 22, a customer-side display 23, and a receipt printer 24, as necessary devices for the settlement. Such settlement apparatus 20 is generally referred to as a point of sales terminal (POS terminal).

Figure 2:
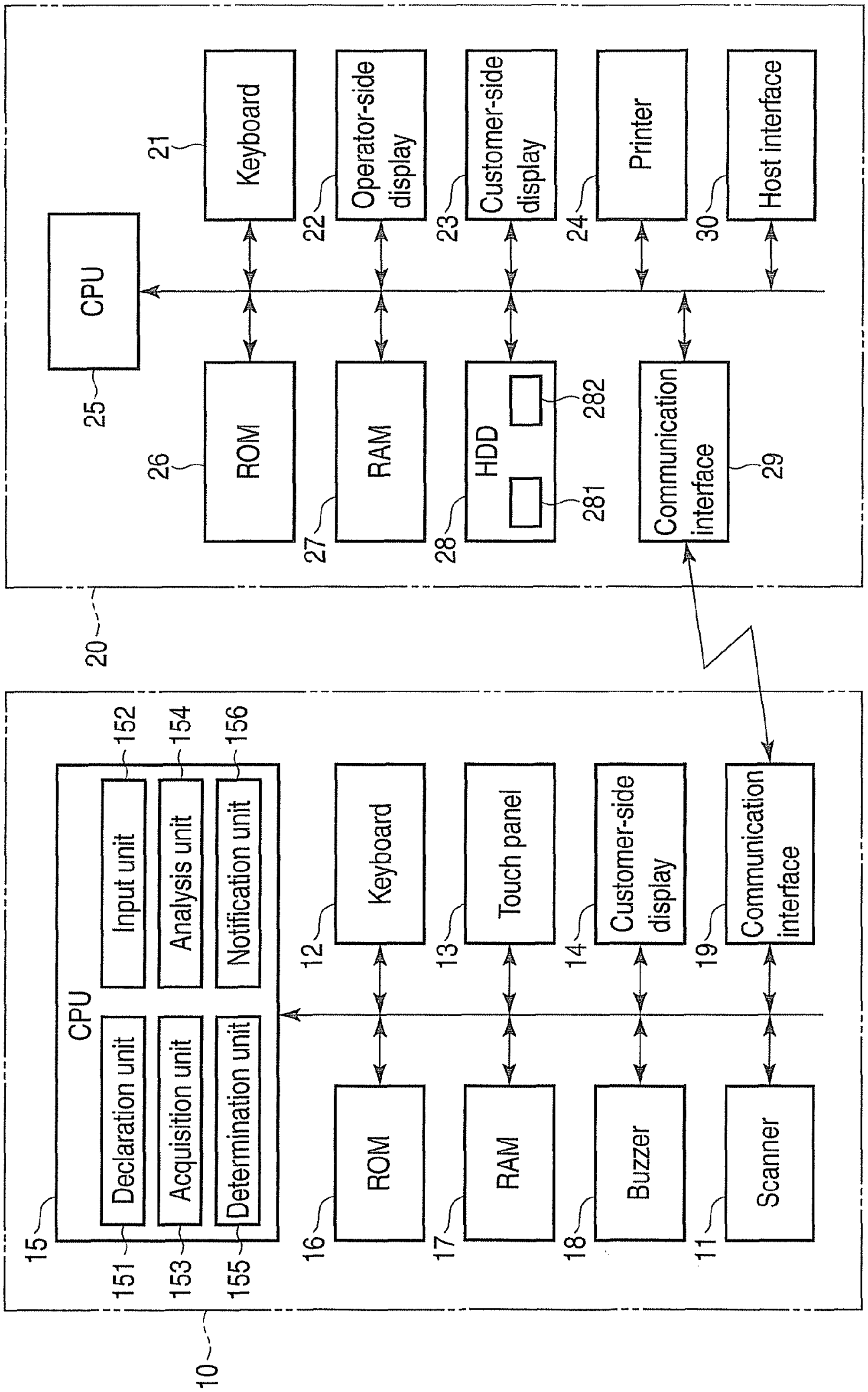
FIG. 2 is a block diagram showing the configuration of essential parts of a registration apparatus and a settlement apparatus constituting the accounting system.

FIG. 2 is a block diagram showing the configuration of essential parts of the registration apparatus 10 and the settlement apparatus 20.

The registration apparatus 10 has a central processing unit (CPU) 15, a read only memory (ROM) 16, a random access memory (RAM) 17, a buzzer 18, and a communication interface 19, in addition to the scanner 11, the keyboard 12, the touch panel 13, and the customer-side display 14.

The settlement apparatus 20 has a CPU 25, a ROM 26, a RAM 27, a hard disk drive (HDD) 28, a communication interface 29, and a host interface 30, in addition to the keyboard 21, the operator-side display 22, the customer-side display 23, and the receipt printer 24.

The registration apparatus 10 and the settlement apparatus 20 transmit and receive data via their respective communication interfaces 19 and 29. The settlement apparatus 20 also transmits and receives data to and from a host computer, not shown, via the host interface 30.

The HDD 28 saves an article file 281 having the data structure shown in FIG. 3 and a message file 282 having the data structure shown in FIG. 4.

As shown in FIG. 3, the article file 281 stores article setting data including attribute code, article name, unit price, separate packaging flag, message number and the like, in association with each article code as article identification data that can identify each article.

The separate packaging flag is set to "1" when an article identified by the corresponding article code is an article to be separately packaged, and reset to "0" when the article is not an article to be separately packaged. Articles from which liquid or the like tends to spill such as meat and fish, and strong-scented articles such as detergents are articles that should be separately packaged. Therefore, the separate packaging flags of the article setting data associated with the article codes of these articles are set to "1". The separate packaging flags of the article setting data associated with the article codes of other articles are reset to "0".

The message number specifies message data that is notified of when an article to be separately packaged is registered in the registration apparatus 10. The message data prompts the cashier to package the article separately. As shown in FIG. 4, the message data is stored in the message file 282 by message number. The article setting data associated with the article code of the article to be separately packaged, that is, the article setting data in which the separate packaging flag is set "1", always includes the message number of a message suitable for prompting separate packaging of the article.

Figure 5:
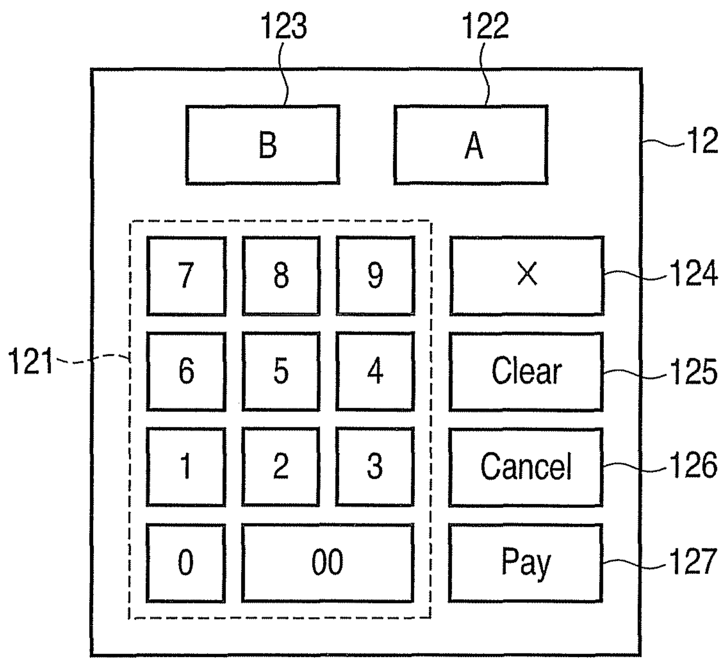
FIG. 5 is a plan view showing a principal key layout provided on a keyboard of the registration apparatus.

FIG. 5 shows the layout of principal keys provided on the keyboard 12 of the registration apparatus 10. The registration apparatus 10 has, on the keyboard 12, function keys including an "A" key 122, a "B" key 123, an "x" key 124, a clear key 125, a cancellation key 126, and a payment key 127, in addition to numeric keys 121 for inputting numerical data in the form of numbers. A part or all of these keys may be arranged as touch buttons on the touch panel 13.

The "A" key 122 is operated at the time of declaring a commercial transaction with a customer who carries a reusable shopping bag. The "B" key 123 is operated at the time of declaring a commercial transaction with a customer who uses a non-reusable shopping bag provided in the store as a shopping bag.

Figure 6:
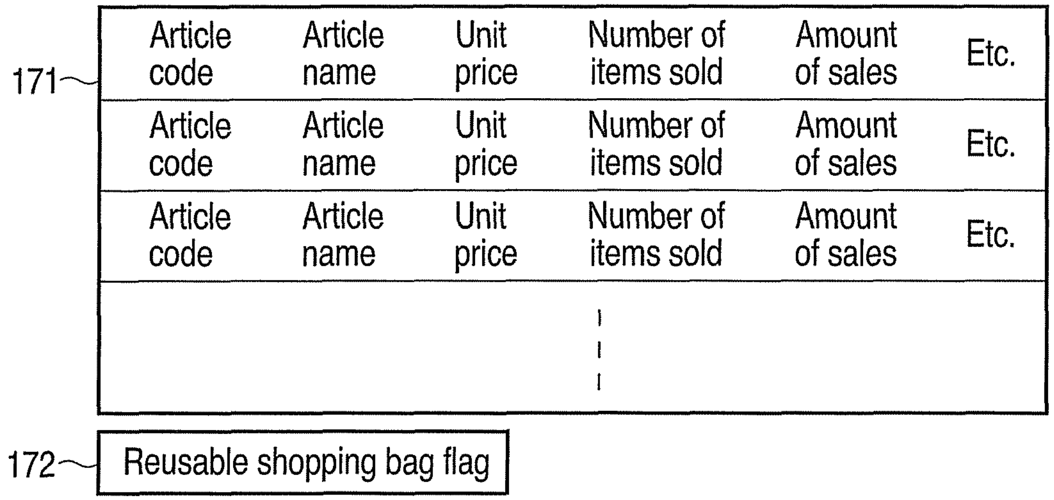
FIG. 6 shows a main memory area formed in a RAM of the registration apparatus in the first embodiment.

FIG. 6 is an explanatory view of a main memory area formed in the RAM 17 of the registration apparatus 10. The registration apparatus 10 has a transaction buffer 171 and a flag memory 172 formed in the RAM 17. The transaction buffer 171 stores article sales data including data items such as article code, article name, unit price, the number of items sold, and the amount of sales, for one transaction. The flag memory 172 stores a reusable shopping bag flag. The reusable shopping bag flag is set to "1" in the case of a commercial transaction with a customer who carries a reusable shopping bag, and reset to "0" in the case of a commercial transaction with a customer who uses a non-reusable shopping bag.

The description now returns to FIG. 2. The CPU 15 of the registration apparatus 10 has functions as a declaration unit 151, an input unit 152, an acquisition unit 153, an analysis unit 154, a determination unit 155, and a notification unit 156.

The declaration unit 151 accepts a declaration input indicating that the customer carries a reusable shopping bag with which the customer takes the purchased articles home. The input unit 152 accepts input of article identification data (article code) that can identify an article purchased by the customer.

The acquisition unit 153 acquires the article setting data stored corresponding to the article identification data with its input accepted by the input unit 152, from the article file 281. The analysis unit 154 analyzes whether the article setting data acquired by the acquisition unit 153 includes information indicating that the article is an article to be separately packaged (separate packaging flag).

The determination unit 155 determines whether the article specified by the article identification data with its input accepted by the input unit 152 is an article to be separately packaged or not. The notification unit 156 notifies that the article should be separately packaged, when the declaration that the customer carries a reusable shopping bag is accepted and it is determined that the article is an article to be separately packaged. These functions will be described specifically with reference to the flowchart of FIG. 7.

Figure 7:
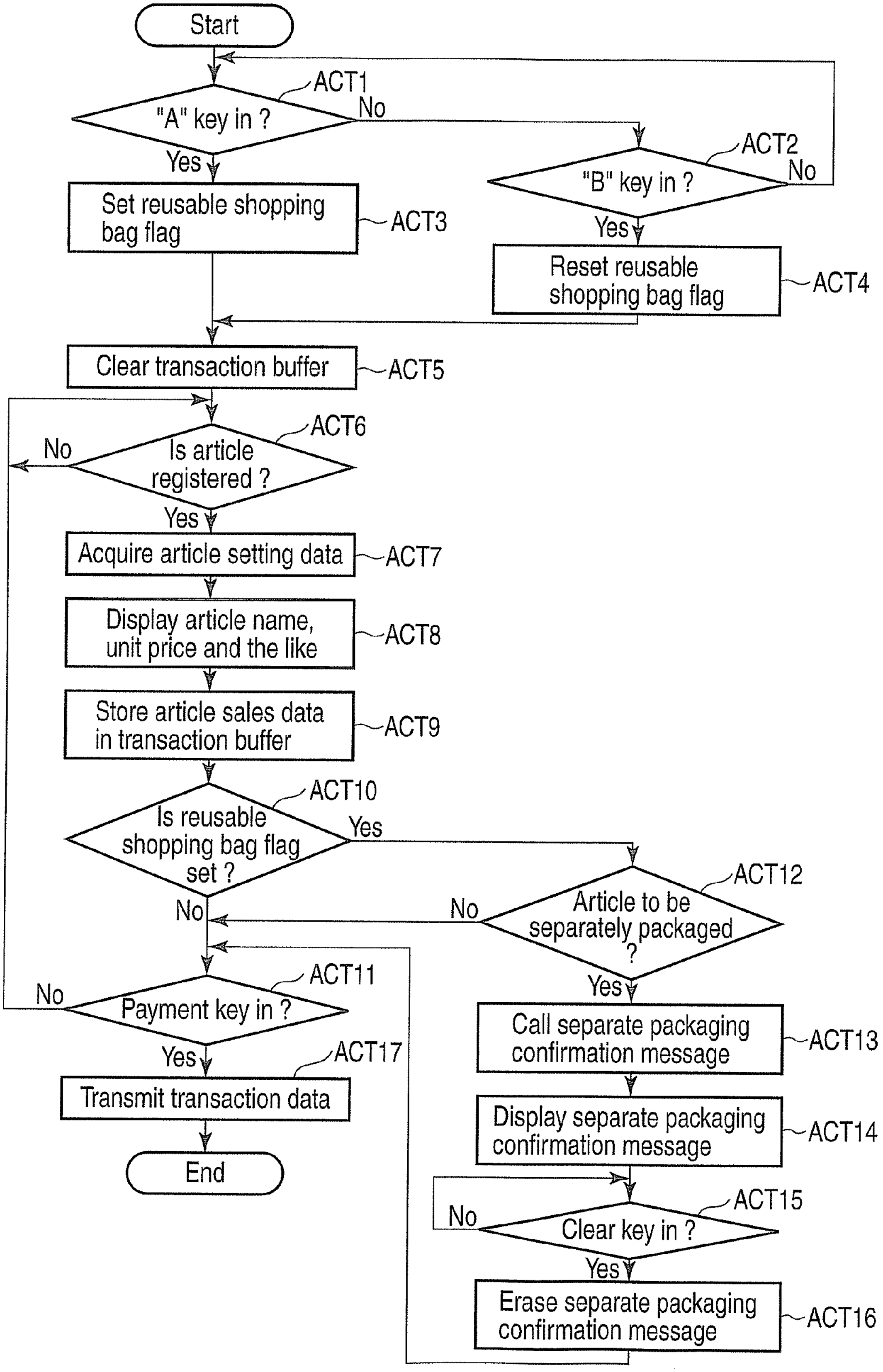
FIG. 7 is a flowchart showing a sales processing procedure for one transaction executed by a CPU of the registration apparatus in the first embodiment.

FIG. 7 is a flowchart showing the sales processing procedure for one transaction executed by the CPU 15 of the registration apparatus 10. The CPU 15 executes sales processing for one transaction following the procedure shown in FIG. 7 according to a program stored in the ROM 16.

First, the CPU 15 waits for a declaration input indicating whether the commercial transaction is a commercial transaction with a customer who carries a reusable shopping bag or a commercial transaction with a customer who uses a non-reusable shopping bag (ACT 1, ACT 2).

When the "B" key 123 is operated and inputted, the CPU 15 accepts a commercial transaction declaration with a customer who uses a non-reusable shopping bag (YES in ACT 2). In this case, the CPU 15 resets the reusable shopping bag flag in the flag memory 172 to "0" (ACT 4).

When the "A" key 122 is operated and inputted, the CPU 15 accepts a commercial transaction declaration with a customer who carries a reusable shopping bag (YES in ACT 1, the declaration unit 151). In this case, the CPU 15 sets the reusable shopping bag flag in the flag memory 172 to "1" (ACT 3).

As the reusable shopping bag flag is set or reset, the CPU 15 clears the transaction buffer 171 (ACT 5). The CPU 15 then waits for the registration of an article (ACT 6).

When an article code in the form of a barcode is scanned by the scanner 11 or an article code allocated to a touch button on the touch panel 13 is inputted by operating the touch button, the CPU 15 accepts the registration of the article identified with the article code (YES in ACT 6, the input unit 152).

The CPU 15 calls the article setting data associated with the article code with its registration accepted, from the article file 281 of the settlement apparatus 20 (ACT 7, the acquisition unit 153). The CPU 15 then causes each of the touch panel 13 and the customer-side display 14 to display the article name, unit price and the like included in the article setting data (ACT 8). The CPU 15 also generates article sales data based on the article code, article name, unit price, the number of items sold, the amount of sales and the like, and stores this data in the transaction buffer 171 (ACT 9).

After that, the CPU 15 examines whether the reusable shopping bag flag is set or not (ACT 10). When the reusable shopping bag flag is reset (NO in ACT 10), a non-reusable shopping bag declaration is given with respect to this commercial transaction. In this case, the CPU 15 determines whether the payment key 127 is inputted or not (ACT 11).

Meanwhile, when the reusable shopping bag flag is set (YES in ACT 10), a reusable shopping bag declaration is given with respect to this commercial transaction. In this case, the CPU 15 analyzes the article setting data to find out whether a separate packaging flag is set in the article setting data acquired in the processing of ACT 7 or not (ACT 12, the analysis unit 154).

When a separate packaging flag is not set as a result of the data analysis (NO in ACT 12), the registered article is not an article to be separately packaged. In this case, the CPU 15 determines whether the payment key 127 is inputted or not (ACT 11).

Meanwhile, when a separate packaging flag is set (YES in ACT 12), the registered article is an article to be separately packaged. In this case, the CPU 15 calls message data provided corresponding to the message number included in the article setting data, from the message file 282 of the settlement apparatus 20 (ACT 13). The CPU 15 then generates a separate packaging confirmation message screen based on the message data and causes the touch panel 13 to display this message screen (ACT 14, the notification unit 156). The message screen is displayed, overlapping the screen that is currently displayed. It is also possible to temporarily erase the screen that is currently displayed, and display the message screen alone.

After the message screen is displayed, the CPUC 15 waits for the clear key 125 to be inputted (ACT 15). The clear key 125 is an operator to command the stop of the notification. When the clear key 125 is operated and inputted (YES in ACT 15), the CPU 15 erases the separate packaging confirmation message screen and restores the touch panel 13 to the state prior to the display of the message screen (ACT 16). After that, the CPU 15 determines whether the payment key 127 is inputted or not (ACT 11).

When the payment key 127 is not inputted (NO in ACT 11), the CPU 15 waits for the next article registration (ACT 6). When the article registration is accepted, the CPU 15 executes the processing of ACT 7 and the subsequent processing again.

When the payment key 127 is inputted (YES in ACT 11), the CPU 15 transmits each article sales data in the transaction buffer 171 to the settlement apparatus 20 as transaction data (ACT 17). The sales processing for one transaction thus ends.

After receiving the transaction data, the CPU 25 of the settlement apparatus 20 performs sales processing of the article sales data based on the transaction data. The CPU 25 then calculates total data of the commercial transaction and causes the operator-side display 22 and the customer-side display 23 to display the total data. Here, when payment data is inputted by the operation input of the keyboard 21, the CPU 25 performs closing based on the payment data and the total data and operates the receipt printer 24 to issue a receipt.

In the first embodiment configured as described above, the cashier first confirms whether the customer carries a reusable shopping bag or not. When the customer carries a reusable shopping bag, the cashier operates the "A" key 122. When the customer does not carry a reusable shopping bag, the cashier operates the "B" key 123. When the reusable shopping bag is a basket-type, the cashier puts this reusable shopping bag on the receiving surface 2*b* instead of the shopping container 6. When the "A" key 122 is pressed, the reusable shopping bag flag is set to "1". When the "B" key 123 is pressed, the reusable shopping bag flag is reset to "0".

The cashier takes out the articles M housed in the shopping container 5 one by one and registers the articles in the registration apparatus 10. Here, when the reusable shopping bag flag is set to "1", that is, in the case of a commercial transaction with a customer who carries a reusable shopping bag, the separate packaging flag in the article setting data corresponding to the registered article M is checked. When the separate packaging flag is set to "1", the message data corresponding to the message number in the article setting data is displayed on the touch panel 13. That is, a message that the article should be separately packaged is given.

Figure 8:
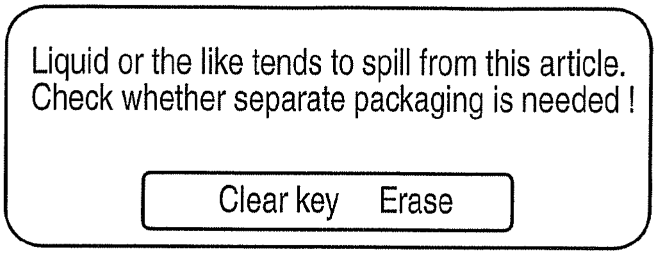
FIG. 8 shows an example of display of a separate packaging confirmation message in the first embodiment.

FIG. 8 shows an example of the display of the message. By confirming this message, the cashier can easily learn that "the registered article needs separate packaging because liquid or the like tends to spill from the article". After confirming the message, the cashier houses the article M in a separate packaging bag that is prepared nearby, and then puts the article M in the shopping container 6 or the reusable shopping bag.

Meanwhile, when the separate packaging flag is not set to "1", the separate packaging confirmation message is not displayed. In this case, the cashier puts the article M directly in the shopping container 6 or the reusable shopping bag.

After confirming the separate packaging confirmation message, the cashier presses the clear key 125. Thus, the message is erased and therefore the cashier continues registering the articles M in the shopping container 5. Then, every time a separate packaging confirmation message is given, the cashier separately packages the article M and then puts the article M in the shopping container 6 or the reusable shopping bag. As the registration of all the articles M in the shopping container 5 is finished in this manner, the cashier presses the payment key 127. The cashier then carries out settlement of the commercial transaction using the settlement apparatus 20.

On the other hand, when the reusable shopping bag flag is set to "0", that is, in the case of a commercial transaction with a customer who does not carry a reusable shopping bag, the separate packaging flag in the article setting data relating to the registered article is not checked. Therefore, even when an article for which the separate packaging flag is set to "1" is registered, no separate packaging confirmation message is given.

In this way, according to the first embodiment, only in a commercial transaction with a customer who carries a reusable shopping bag, a separate packaging confirmation message is given with respect to an article to be separately packaged. Therefore, the burden on the cashier can be significantly reduced, compared with the case where a similar message is displayed in all commercial transactions. Moreover, the check of the separate packaging flag is limited to a commercial transaction with a customer who uses a reusable shopping bag. Therefore, the overall processing time is reduced and the processing efficiency is improved, compared with the case where the check is carried out in all commercial transactions.

In the first embodiment, it is possible to carry out a service that, for a customer who uses a reusable shopping bag, the cashier securely separately packages an article that needs separate packaging, and then puts the article in the reusable shopping bag. Moreover, even when a separately packaged article is put in the shopping container 6 instead of a reusable shopping bag, the article that needs separate packaging is securely separately packaged by the cashier. Therefore, when the customer shifts the articles from the shopping container 6 to the reusable shopping bag at a packing counter, the customer does not have to take time and effort to separately package the articles.

Thus, according to the first embodiment, customers who use a reusable shopping bag and customers who do not use a reusable shopping bag can be differentiated. Therefore, customers who use a reusable shopping bag are expected to increase. Consequently, consumers appreciate the store as being proactive in the environment protection movement and further increase of customers is expected.

In the first embodiment, when a separate packaging confirmation message is notified of, the notification is not stopped unless the clear key 125 is pressed, and therefore the next operation cannot be started. Therefore, according to the first embodiment, a cashier's work error of failing to see the message and housing an article to be separately packaged, without separate packaging, in the shopping container 6 or the reusable shopping bag, can be prevented.

Second Embodiment

In the first embodiment, in order to prevent failure to separately package an article, the separate packaging confirmation message is not erased unless the clear key 125 is pressed. However, with such a configuration, the need to press the clear key 125 every time the message is displayed is troublesome.

Thus, a second embodiment that can avoid the foregoing troublesomeness by automatic erasure of the separate packaging confirmation message interlocked with the next article registration will be described with reference to the drawings. The same parts as in the first embodiment are denoted by the same reference numerals and will not be described further in detail.

Figure 9:
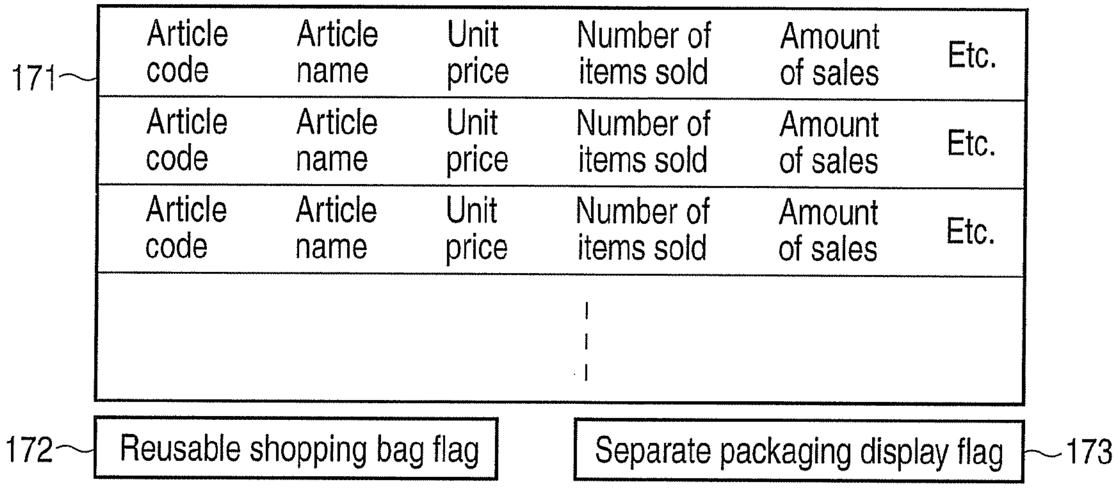
FIG. 9 shows a main memory area formed in the RAM of the registration apparatus in the second embodiment.

FIG. 9 is a schematic view showing a main memory area formed in the RAM 17 of the registration apparatus 10 in the second embodiment. In the second embodiment, a flag memory 173 for the separate packaging flag is formed in the RAM 17, in addition to the transaction buffer 171 and the flag memory 172 for the reusable shopping bag flag described in the first embodiment. The separate packaging flag is reset to "0" when a message that separate packaging should be done is not displayed, and set to "1" when the message is displayed.

Figure 10:
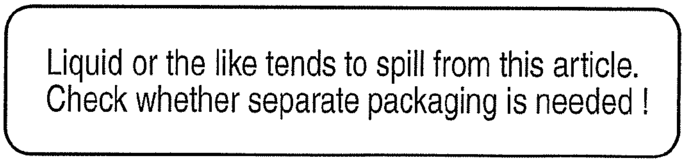
FIG. 10 shows an example of display of a separate packaging confirmation message in the second embodiment.

FIG. 10 shows an example of the separate packaging confirmation message displayed in the second embodiment. As can be clearly seen from the comparison with FIG. 6 of the first embodiment, the message need not be erased by the clear key 125 and therefore the corresponding information is omitted.

Figure 11:
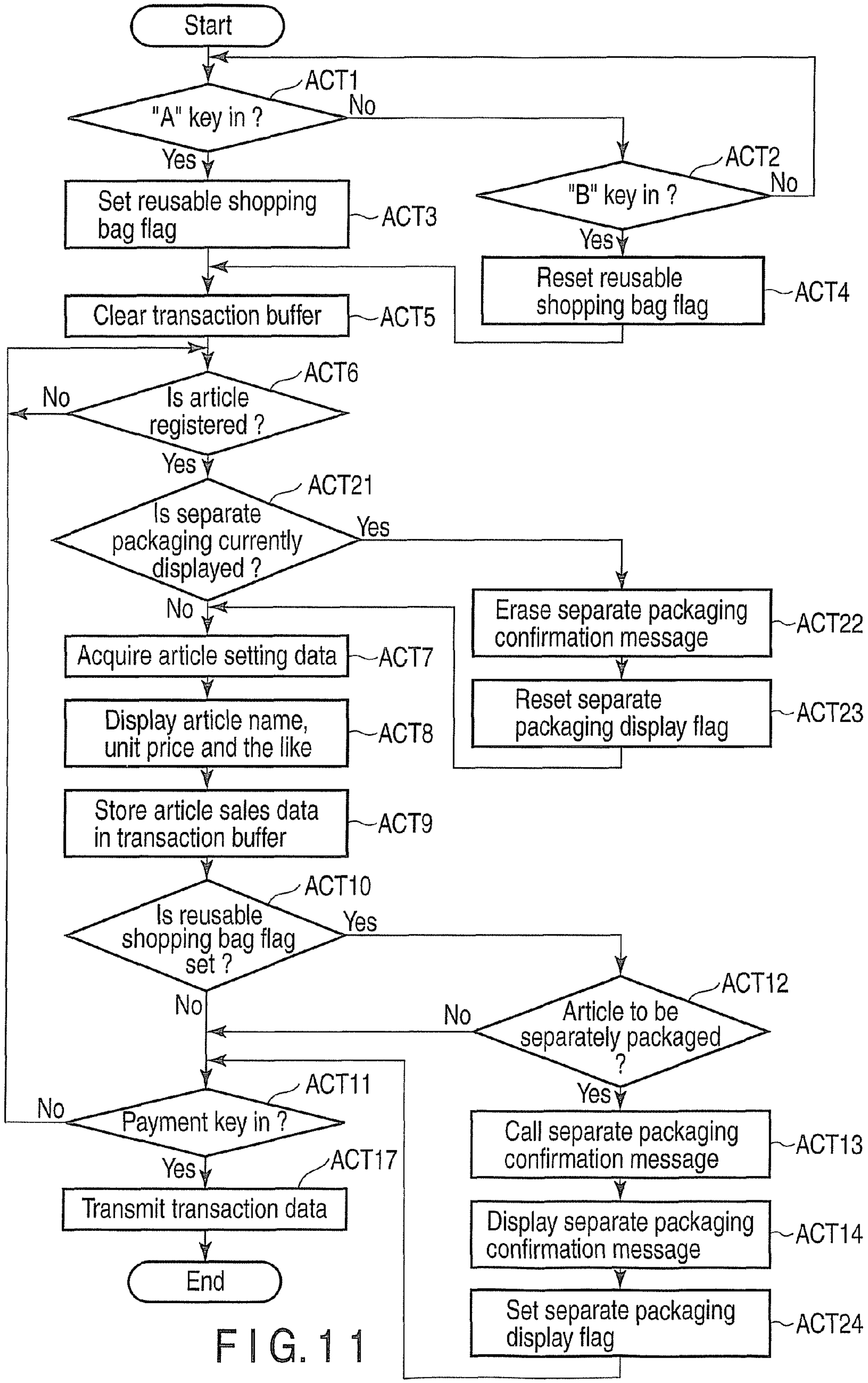
FIG. 11 is a flowchart showing a sales processing procedure for one transaction executed by the CPU of the registration apparatus in the second embodiment.

FIG. 11 is a flowchart showing the sales processing procedure for one transaction executed by the CPU 15 of the registration apparatus 10 in the second embodiment. The CPU 15 executes the sales processing for one transaction following the procedure shown in FIG. 11 according to a program stored in the ROM 16.

One of the differences between this procedure and the first embodiment is a processing after the separate packaging confirmation message is displayed on the touch panel 13 in the processing of ACT 14. In the second embodiment, when the separate packaging confirmation message is displayed on the touch panel 13, the CPU 15 sets the separate packaging display flag in the flag memory 173 to "1" (ACT 24). After that, the CPU 15 determines whether the payment key 127 is inputted or not (ACT 11).

Another difference from the first embodiment is a processing after the registration of an article is accepted in the processing of ACT 6. In the second embodiment, when an article is registered, the separate packaging display flag is checked (ACT 21). Here, when the separate packaging display flag is "0", that is, when the separate packaging confirmation message screen is not displayed (NO in ACT 21), the processing immediately shifts to ACT 7.

Meanwhile, when the separate packaging display flag is "1", that is, when the separate packaging confirmation message screen is displayed (YES in ACT 21), the CPU 15 erases this message screen and restores the touch panel 13 to the state prior to the display of the message (ACT 22). Also, the separate packaging display flag is reset "0" (ACT 23). After that, the processing shifts to ACT 7.

In the second embodiment with such a configuration, too, the separate packaging confirmation message is given with respect to an article to be separately packaged, only in a transaction with a customer who carries a reusable shopping bag. This message is then automatically erased by the registration of the next article.

Therefore, according to the second embodiment, the particular operation to erase the message is no longer necessary. Consequently, the troublesomeness on the cashier side is eliminated. Moreover, the time required for the sale processing is reduced further. Therefore, there is no concern over delay in the checkout operation.

Next, modifications of each embodiment will be described.

In order to erase the separate packaging confirmation message, the first embodiment discloses the configuration that requires the operation of the clear key and the second embodiment discloses the configuration that does not require the operation of the clear key. In another embodiment of the registration apparatus 10, both the configuration that requires the operation of the clear key and the configuration that does not require the operation of the clear key are provided so that the user can select a desired configuration.

In the first or second embodiment, the registration apparatus 10 incorporated in the accounting system that is operated by the cashier in a supermarket is described as an example. The registration apparatus 10 is not limited to the cashier-operated type. A self-scanning type machine may also be employed. In the case where the self-scanning type registration apparatus 10 is applied to the embodiments, when a customer registers an article by himself or herself, assistance can be provided in the determination whether to package the article separately or not. Therefore, the benefit to customers who use a reusable shopping bag can be increased.

In the first or second embodiment, the reusable shopping bag declaration unit is configured by accepting the input of the "A" key 122. The declaration unit is not limited to this configuration.

A first modification of the declaration unit uses a member card to be held by a member customer. The member card stores a member code unique to the member and information about whether to use a reusable shopping bag or not. The registration apparatus 10 has a card reader to read data on the member card. When the information on the member card is read by the card reader, the registration apparatus 10 determines whether the customer is a customer who uses a reusable shopping bag or not, on the basis of the card data.

A second modification of the declaration unit uses a member card as well. However, the member card does not store information about whether to use a reusable shopping bag or not. The information about whether to use a reusable shopping bag or not is stored for each member in a member master file. A card reader to read data on the member card is provided. When the information on the member card is read by the card reader, the registration apparatus 10 searches the member master file and determines whether to use a reusable shopping bag or not.

A third modification of the declaration unit uses an RFID tag and a tag reader. The RFID tag is attached to the reusable shopping bag carried by a customer. The tag reader is connected to the registration apparatus 10. The antenna of the tag reader is buried in the receiving surface 2*b* of the checkout counter 2. As the RFID tag is recognized via the antenna, the registration apparatus 10 determines that the customer is a customer who uses a reusable shopping bag.

None of the first, second and third modifications of the declaration unit requires the operation by the cashier. Therefore, there is an advantage that the burden on the cashier can be reduced further.

In the first or second embodiment, a purchased article registration program is recorded in advance in the ROM 16 within the registration apparatus 10. The purchased article registration program may also be downloaded to the registration apparatus 10 from a network and then stored in the RAM 17. Alternatively, a similar program stored in a recording medium may be installed in the registration apparatus 10.

As recording medium, any recording medium that can store a program and can be read by the apparatus, such as CD-ROM, can be used. The function thus acquired in advance by installing or downloading may be realized in cooperation with the OS (operating system) within the apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A purchased article registration apparatus at an electronic checkout comprising:

an declaration unit of the electronic checkout which electronically accepts a declaration input indicating that a customer carries a reusable shopping bag within which the customer takes a purchased article home;

an electronic input unit at the electronic checkout which electronically accepts input of article identification data that identifies the article to be purchased by the customer;

an electronic determination unit at the electronic checkout which electronically determines, in response to the article specified by the article identification data having its input accepted by the input unit, whether the article is an article to be separately packaged in a bag prior to insertion into the reusable shopping bag of the customer;

an electronic notification unit at the electronic checkout which electronically notifies to separately package the article, determined as an article to be separately packaged, in the bag prior to insertion into the reusable bag of the customer, in response to the declaration that the customer carries the reusable shopping bag is accepted and in response to the determination that the article is an article to be separately packaged;

and a purchasing unit at the electronic checkout which accepts payment from the customer for the article purchased that is separately packaged in the bag and then inserted within the reusable shopping bag of the customer.

2. The apparatus of claim 1, wherein the electronic determination unit determines whether the article is an article to be separately packaged or not, every time the input unit accepts the input of the article identification data when the declaration that the customer carries the reusable shopping bag is accepted.

3. The apparatus of claim 2, further comprising an operator which commands stop of a notification, wherein the electronic notification unit stops the notification when the operator is operated and inputted.

4. The apparatus of claim 2, wherein the electronic notification unit stops the notification when the article identification data of a next purchased article is inputted by the electronic input unit.

5. The apparatus of claim 1, further comprising:

an acquisition unit which acquires, from an article file that stores article setting data including information to identify whether each article is an article to be separately packaged or not in association with the article identification data of each article, the article setting data stored corresponding to the article identification data with its input accepted by the input unit; and an analysis unit which analyzes whether the article setting data acquired by the acquisition unit includes information indicating that the article is an article to be separately packaged, wherein the electronic determination unit makes the determination based on a result of the analysis by the analysis unit.

6. The apparatus of claim 5, wherein every time the electronic input unit accepts the input of the article identification data, the acquisition unit acquires the article setting data of the article specified by the article identification data, and the analysis unit makes the analysis every time a calling unit calls the article setting data when the declaration that the customer carries the reusable shopping bag is accepted.

7. The apparatus of claim 6, further comprising a flag memory which stores a reusable shopping bag flag that is set when the declaration that the customer carries the reusable shopping bag is accepted, wherein the analysis unit makes the analysis every time the calling unit calls the article setting data when the reusable shopping bag flag stored in the flag memory is set.

8. The apparatus of claim 6, further comprising an operator which command stop of a notification, wherein the electronic notification unit stops the notification when the operator is operated and inputted.

9. The apparatus of claim 6, wherein the electronic notification unit stops the notification when the article identification data of a next purchased article is inputted by the electronic input unit.

10. A purchased article registration method at an electronic checkout comprising:

electronically declaring at the electronic checkout that the customer carries a reusable shopping bag operable to take purchased items home;

inputting, by an electronic input unit at the electronic checkout, article identification data identifying the article purchased by the customer;

electronically determining, at the electronic checkout, in response to the article specified by the article identification data having its input accepted by the input unit, whether the article is an article to be separately packaged in a bag prior to insertion within the reusable shopping bag of the customer;

electronically notifying, through the electronic checkout, to separately package the article, determined as an article to be separately packed, in the bag prior to insertion into the reusable shopping bag of the customer, in response to the declaration that the customer carries the reusable shopping bag is accepted and in response to the determination that the article is an article to be separately packaged;

and accepting payment at the electronic checkout from the customer for the article purchased, wherein the article purchased that is separately packaged in the bag and then inserted within the reusable shopping bag.

* * * * *